United States Patent
Zhuo et al.

(10) Patent No.: US 12,024,449 B2
(45) Date of Patent: Jul. 2, 2024

(54) SEWAGE TREATMENT PROCESS WITH MAGNETIC SLUDGE CARBON CARRIER COOPERATED WITH STANDARD UPGRADING AND CAPACITY IMPROVEMENT

(71) Applicant: Zhejiang Zone-King Environmental Sci & Tech Co., Ltd, Hangzhou (CN)

(72) Inventors: Weilong Zhuo, Hangzhou (CN); Yufeng Wang, Hangzhou (CN); Ping Tian, Hangzhou (CN); Quan Tang, Hangzhou (CN); Hui Li, Hangzhou (CN); Yiru Shao, Hangzhou (CN)

(73) Assignee: Zhejiang Zone-King Environmental Sci & Tech Co., Ltd, Hangzhou (CN)

( * ) Notice: Subject to any disclaimer, the term of this patent is extended or adjusted under 35 U.S.C. 154(b) by 296 days.

(21) Appl. No.: 17/302,840

(22) Filed: May 13, 2021

(65) Prior Publication Data
US 2022/0242769 A1   Aug. 4, 2022

(30) Foreign Application Priority Data
Feb. 4, 2021   (CN) .......................... 202110150864.1

(51) Int. Cl.
- *C02F 11/15*   (2019.01)
- *C02F 11/10*   (2006.01)
- *C02F 11/121*  (2019.01)

(52) U.S. Cl.
CPC .............. *C02F 11/15* (2019.01); *C02F 11/10* (2013.01); *C02F 11/121* (2013.01)

(58) Field of Classification Search
None
See application file for complete search history.

(56) References Cited

U.S. PATENT DOCUMENTS

| | | | | |
|---|---|---|---|---|
| 6,673,244 B1* | 1/2004 | Maekawa | ............... | C02F 3/108 |
| | | | | 210/603 |
| 2016/0221853 A1* | 8/2016 | Cort | ..................... | C02F 11/121 |
| 2021/0147268 A1* | 5/2021 | Chai | ..................... | C02F 3/104 |

FOREIGN PATENT DOCUMENTS

| | | |
|---|---|---|
| CN | 103739177 A | 4/2014 |
| CN | 110577285 A | 12/2019 |
| CN | 110902807 A | 3/2020 |

OTHER PUBLICATIONS

Chang et al. (CN 206529379U)—Phenolic Wastewater Treatment Device With Magnetic Activated Carbon As Carrier (Sep. 29, 2017). (Year: 2017).*

(Continued)

*Primary Examiner* — Hayden Brewster
(74) *Attorney, Agent, or Firm* — Schwegman Lundberg & Woessner, P.A.

(57) ABSTRACT

A method comprises: removing most suspending solid pollutants after a primary treatment for the sewage which is then placed into a secondary biochemical treatment section; mixing the magnetic sludge carbon carrier and a solvent to prepare a mixed solution which is then placed into the secondary biochemical treatment section synchronously with the sewage; uniformly mixing the sewage, the magnetic sludge carbon carrier and the activated sludge in a biochemical treatment construction; performing a dreg-water separation in a sedimentation tank on the mixed solution flowing out of the secondary biochemical treatment section; and recycling magnetic particles with the magnetic separation apparatus. The sewage treatment process with a magnetic sludge carbon carrier cooperated with standard upgrading and capacity improvement, which not only addresses sludge removal in sewage treatment plants, but also is cooperated with standard upgrading and capacity improvement, has (Continued)

advantages of saving investment cost, good sewage treatment effect, environmental friendliness etc.

10 Claims, 1 Drawing Sheet

(56) References Cited

OTHER PUBLICATIONS

Zhang (CN109092249A)—A Sintering-free Magnetization Of Paramagnetic Sludge Carbon Carrier For Enhancing Biological Treatment Of Sewage (Dec. 28, 2018). (Year: 2018).*
Li (CN111377533B)—Sewage Treatment Microorganism Carrier And Preparation Method Thereof (Dec. 1, 2020). (Year: 2020).*

* cited by examiner

SEWAGE TREATMENT PROCESS WITH MAGNETIC SLUDGE CARBON CARRIER COOPERATED WITH STANDARD UPGRADING AND CAPACITY IMPROVEMENT

CROSS-REFERENCE TO RELATED APPLICATIONS

This Non-provisional application claims priority under 35 U.S.C. § 119(a) to Chinese Patent Application No 202110150864.1 filed on Feb. 4, 2021, the entire contents of which are hereby incorporated by reference in their entirety.

TECHNICAL FIELD

The disclosure relates to a treatment method for sludge utilization in a sewage treatment plant, in particular to a sewage treatment process with a magnetic sludge carbon carrier cooperated with standard upgrading and capacity improvement.

BACKGROUND ART

With a rapid development of the economy and society, arised environmental problems are becoming increasingly prominent, and the environmental management is becoming increasingly strict. Currently, Discharge Standard of Pollutants for Municipal Sewage Treatment Plant (GB 18918-2002) serves as a main implementation standard of pollutant emission standard for sewage treatment plants, in which "First Grade A" standard is the highest requirement. However, in practical projects, a wave of sewage treatment projects with "Class IV groundwater" or "quasi-Class IV water" as a discharge standard has emerged. To this end, a series of local mandatory standards have been promulgated in succession, such as Discharge Standard of Main Water Pollutants for Municipal Sewage Treatment Plant in Zhejiang Province (DB33/2169-2018) which is compared in the following table.

TABLE

Discharge Limits for Main Water Pollutants

| | Limits for Water Pollutants (mg/L) | | |
|---|---|---|---|
| Pollutants | "Discharge Standard of Pollutants for Municipal Sewage Treatment Plant" GB18918-2002 First Class, A | "Discharge Standard of Main Water Pollutants for Municipal Sewage Treatment Plant" in Zhejiang Province DB33/2169-2018 newly built sewage treatment plant | Surface Water Environmental Quality Standard GB3838-2002 Category IV |
| Chemical Oxygen Density | 50 | 30 | 30 |
| Ammonia-Nitrogen | 5 (8) | 1.5 (3.0) | 1.5 |
| Total Nitrogen | 15 | 10 (12) | 1.5 |
| Total Phosphorus | 0.5 | 0.3 | 0.3 |

Note:
The values in parentheses are implemented from November 1 to next March 31 of each year With increasingly more sewage discharge, complex pollutant types and strict pollutant discharge limit standards, there is caused a strong demand for expanding or enlarging sewage treatment plants. However, there are obvious shortcomings for a newly built or expanded sewage treatment plant, such as shortage of land resources, difficulty in land acquisition, long project construction period, large initial investment and high construction cost. Therefore, there is an urgent need for a technology to improve treating capacity of a water plant under operating conditions of the original sewage treatment plant.

Sludge-based biocoke (sludge carbon) refers to products produced by heating and carbonizing sludge from the sewage treatment plant at high temperature. The sludge carbon has characteristics of a large specific surface area and a rich porous structure, and has a wide range of resource utilizations, such as being used as a microbial synergistic composite filler, a soil modifier or a soil fertilizer, etc. However, in practical applications, due to strict policies and rules, resource utilization of the sludge carbon is limited.

There are many researches on adding powder carriers in a sewage biochemical treatment section to improve sewage biochemical treatment capacity. A novel biological fluidized bed process for treating municipal sewage using high-concentration powder carriers is disclosed in Chinese patent application CN201911051940.2, in which composite powder carriers are added to the biochemical treatment section, a new stirring system is added, and a mixed solution is concentrated and separated with supernatants being discharged after passing through a high-efficiency clarifier and a filtration tank, and the residual sludge being recycled with the power carriers by a cyclone recycler.

A powder enhanced biochemical water treatment method is disclosed in Chinese patent application CN201911131996.9, which increases biological treating volume load, improves a concentration of microorganisms and meets requirements on increased quality of processed effluent through steps such as screening powder carriers, preparing a powder slurry, hydraulic stirring, loading the microorganisms on the powder carriers, treating the sewage by a biological reaction, settling and recycling and the like. However, most of the above powder carriers are diatomite, zeolite or activated carbon, which is economically costly and prone to a secondary pollution for non-environment-friendly materials.

A magnetic coagulation technology is to add magnetic powders synchronously in a coagulation sedimentation process to flocculate them with the pollutants, so as to strengthen coagulation and flocculation effect, making produced flocculates denser and firmer and achieving a high-speed sedimentation. The magnetic powder can be recycled magnetically. Compared with traditional technologies, the magnetic coagulation technology has many advantages, such as the high-speed sedimentation, recycling, small footprint, small investment and so on. However, the magnetic powder also poses disadvantages of high cost and high consumption.

To sum up, it is of great significance to combine advantages of the above three processes, namely, the sludge carbon process, the process by adding the powder carriers in sewage biochemical treatment section and the magnetic coagulation technology, overcome their respective shortcomings, and develop a process that can not only address sludge removal in sewage treatment plants, but also is cooperated with standard upgrading and capacity improvement.

SUMMARY

An object of the present disclosure is to overcome the above shortcomings in the prior art, and to provide a sewage treatment process with a magnetic sludge carbon carrier cooperated with standard upgrading and capacity improvement, which can not only address sludge removal in sewage treatment plants, but also is cooperated with standard upgrading and capacity improvement, and has advantages of saving investment cost, improved sewage treatment effect, environmental friendliness and the like.

A technical solution used in the disclosure to solve the above problems is: the sewage treatment process with a magnetic sludge carbon carrier cooperated with standard upgrading and capacity improvement including following steps:

Step 1: removing most suspending solid pollutants after a primary treatment for the sewage which is then placed into a secondary biochemical treatment section;

Step 2: mixing the magnetic sludge carbon carrier and a solvent to prepare a mixed solution which is then placed into the secondary biochemical treatment section synchronously with the sewage;

Step 3: uniformly mixing the sewage, the magnetic sludge carbon carrier and the activated sludge in a biochemical treatment construction, in which microorganisms are attached on a surface of the magnetic sludge carbon carrier and adsorbed in its interior channels, and multiply in number to generate a composite biofilm; and the channels of the magnetic sludge carbon carrier can also be used for adsorbing a part of pollutants and forming high-concentration and high-density composite carrier particles so as to improve treatment efficiency of this whole biochemical system;

Step 4: performing a dreg-water separation in a sedimentation tank on the mixed solution flowing out of the secondary biochemical treatment section, after which a supernatant flows into an advanced treatment section and is discharged after reaching a standard, and one part of sediments, which are mainly composite carrier particles, are refluxed to a front influent end of the secondary biochemical treatment section and the other part thereof flow to a magnetic separation apparatus;

Step 5: recycling magnetic particles with the magnetic separation apparatus, in which the magnetic particles are reclaimed to the front influent end of the secondary biochemical treatment section through a magnetic powder recovery device, and the remaining non-magnetic suspending sludge particles are processed jointly by a sludge deep dewatering process and a carbonization process to generate a new magnetic sludge carbon carrier, which can be used for its own front-end sewage treatment or can be sold.

Further, in step 1, the primary treatment mainly includes a physical treatment method such as through a bar screen or grit chamber.

Further, in step 2, the magnetic sludge carbon carrier mixed solution is stirred by a stirring vessel to obtain a concentration of 1-5%, and is pumped into the front influent end of the secondary biochemical treatment section by a screw pump.

Further, in step 2, a specific surface area of the magnetic sludge carbon carrier is 30-100 $m^2/g$, with a density controlled to be 0.9-1.2 $g/m^3$.

Further, in step 3, a ratio of a sewage inflow to the magnetic sludge carbon carrier is 30-60:1, and a sludge concentration for the biochemical system can be increased to 5000-9000 mg/L, and the microorganisms are attached and adsorbed on the magnetic sludge carbon carrier, so that a microorganism concentration is increased and a removal efficiency for the biochemical system is enhanced.

Further, in step 4, the composite carrier particles are gravity settled in the sedimentation tank, and are refluxed to the front influent end of the secondary biochemical treatment section by a sludge reflux pump with a reflux ratio of 50-150%.

Further, in step 4, the magnetic particles and the non-magnetic suspending sludge particles are separated from the sediment by a drum type magnetic powder recovery device, with a magnetic field intensity of 4500-6000 Gs, and the separated magnetic particles are placed into a preparation vessel in step 2 to prepare the mixed solution, which is reused and added to the front influent end of the secondary biochemical treatment section.

Further, in step 5, the magnetic separation device is an electromagnetic separation device, in which an automatic control method is adopted in the treatment process and its power is automatically cut off for 10-30 s every a certain time so that the magnetic particles adsorbed on the electromagnet drop and are collected.

Furthermore, in step 5, after the non-magnetic suspending sludge particles are collected in a transfer tank, a bioleaching is performed on the sludge for 36-48 hours during which special bioleaching microbial nutrients are quantitatively added in the bioleaching process; and after the sludge bioleaching is complete, the dewatering of the sludge can be improved and a specific resistance of the sludge can be reduced.

Furthermore, in step 5, after the bioleaching of the sludge is completed, the sludge is pumped into a high-pressure diaphragm plate and frame with a high-pressure feed pump for filter press dewatering with a pressure of 1.6-2.0 MPa, and after a pressure chamber is filled up with the sludge, a press pump is switched for a secondary press dewatering with a pressure of 6.0-7.0 MPa, and moisture content of the dehydrated sludge can be directly reduced to 40%-50% after the secondary high-pressure press dewatering.

Further, in step 5, a main flow of the carbonization process is drying-carbonization (synchronous activation), and a dehydrated sludge cake obtained by the dewatering process is further dried to a moisture content of 20-25%, and then is transported to a carbonization furnace for carbonization after being mixed with the mixed solution in a certain ration, and a temperature is kept constant during the pyrolysis carbonization and a carbonization chamber is in an oxygen-free or anoxic state.

Further, in step 5, a pyrolysis temperature of the carbonization furnace is 500-650° C., and residual heat (300-400° C.) after the carbonization is used for drying the sludge by the dryer.

Further, in step 5, the sludge is carbonized, pyrolyzed and then cooled and sieved to obtain a magnetic sludge carbon product.

Compared with the prior art, the disclosure has following advantages:
1. There is no need to build or expand the biochemical section construction for upgraded standard and improved capacity for the sewage treatment plant, which solves shortcomings such as difficulty in land acquisition, long project construction period, large initial investment and high construction cost.
2. Adding the magnetic sludge carbon carrier can directly increase the biochemical treatment volume load and increase the microbial concentration, thus improving pollutant removal efficiency and ensure a good water quality.
3. The magnetic sludge carbon carrier is recovered through a magnetic drum, cycled, returned to the biochemical treatment system and reused for multiples times, which saves operation costs and improves utilization of the carrier.
4. The magnetic sludge carbon carrier adsorbs and adheres certain microorganisms and pollutants, providing an increased specific gravity and good sedimentation.
5. Refluxing the sludge ensures the sludge concentration for the biochemical treatment system, and the carrier particles attached with biofilms can further reduce the pollutant concentration, reduce time for and number of biofilm formation on the carrier, and maintain a high pollutant treatment efficiency in the system.
6. With the remaining sludge in the sewage treatment plant as a raw material, the moisture content of the sludge is reduced to 0 in an economic and energy-saving way so as to prepare the magnetic sludge carbon carrier; and the disclosure not only addresses a problem of treatment and disposal of the residual sludge, but also realizes the resource utilization of the sludge.
7. A bioleaching process is used for the sludge deep dewatering, in which the special bioleaching microbial nutrients contain a certain amount of iron salt, so that the sludge carbon can obtain magnetism without adding additional magnetic source materials, which both completes the deep dewatering of the sludge and reduces preparation cost of adding the magnetism.
8. The magnetic sludge carbon carrier can be used by the sewage treatment plant for their own use or can be sold, which can save procurement and operation costs or generate economic benefits and realize high added value of products.
9. The whole processes realize cyclic standard upgrading and capacity improvement in the sewage treatment plant and each single process can also run independently, with a strong operability.
10. The process has advantages of strong feasibility, low cost, high production efficiency and the like, and it is suitable for large-scale production, has good environmental and economic benefits, and presents technical advantages of environmental friendliness and sustainable development.

DETAILED DESCRIPTION

In the following, the present disclosure will be further described in detail in conjunction with the drawings and by way of embodiments which present explanation of the present disclosure and the present disclosure is not limited to the following embodiments.

Embodiments 1

Figure 1:
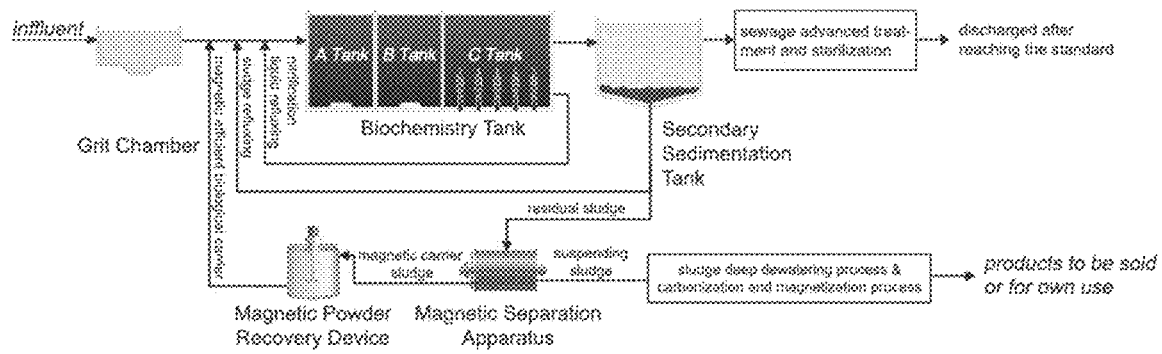
FIG. 1 is a schematic diagram of an overall process flow according to an embodiment of the present disclosure.
Figure 2:
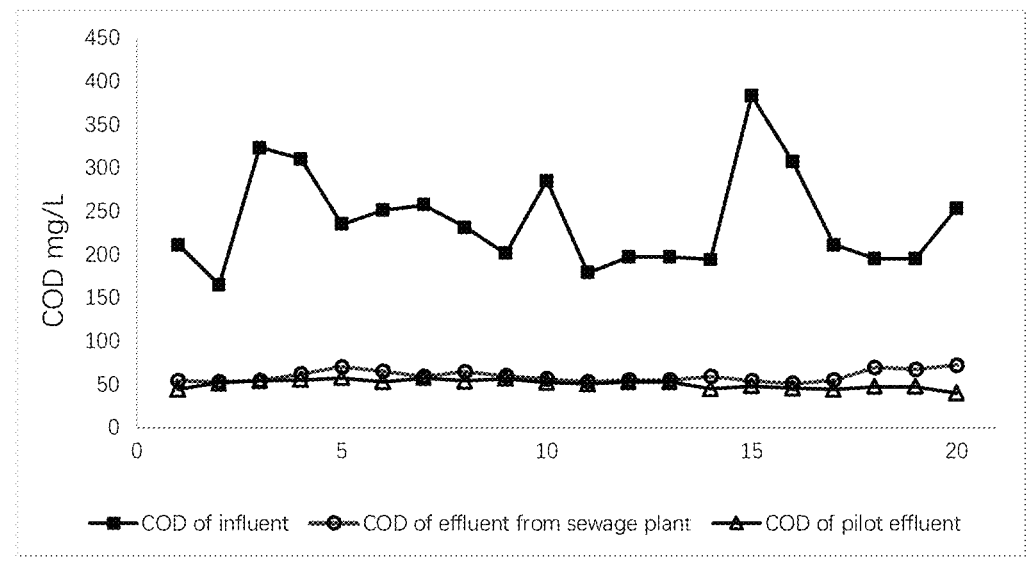
FIG. 2 is a schematic diagram showing a change of COD concentration of pilot influent and effluent according to an embodiment of the present disclosure.
Figure 3:
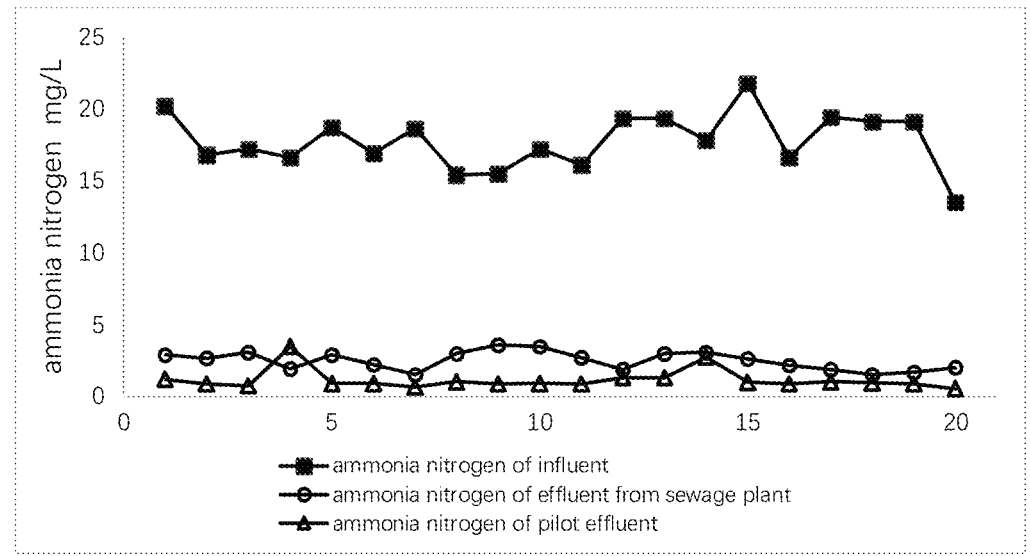
FIG. 3 is a schematic diagram showing a change of ammonia nitrogen concentration change of pilot influent and effluent according to an embodiment of the present disclosure.

Referring to FIG. 1 to FIG. 3, it should be noted that structures, scales, sizes and the like shown in the drawings in this specification are only intended to be combined with content disclosed in this specification for understanding and reading by persons familiar with this art, but not to limit implementation conditions of this disclosure, and thus have no technical substantive significance; and any structural modification, change of scale relationships or adjustment of sizes should still fall within the scope covered by the technical content disclosed in the present disclosure without affecting the efficacy and objects of this disclosure. At the same time, terms such as "upper", "lower", "left", "right", "middle" and "an" referenced in this specification are only for convenience of description and clarity, but not intended to limit the implementable scope of the present disclosure; and the change or adjustment to its relative relation shall be regarded as within the implementable scope of the present disclosure without any substantial change to the technical content.

A sewage treatment process with a magnetic sludge carbon carrier cooperated with standard upgrading and capacity improvement in this embodiment includes Step 1 to Step 5.

In Step 1, removing most suspending solid pollutants after a primary treatment for the sewage which is then placed into a secondary biochemical treatment section, wherein the primary treatment mainly includes a physical treatment method such as through a bar screen or grit chamber.

In step 2, mixing the magnetic sludge carbon carrier and a solvent to prepare a mixed solution which is then placed into the secondary biochemical treatment section synchronously with the sewage, wherein the magnetic sludge carbon carrier mixed solution is stirred by a stirring vessel to obtain a concentration of 1-5%, and is pumped into the front influent end of the secondary biochemical treatment section by a screw pump; a specific surface area of the magnetic sludge carbon carrier is 30-100 m$^2$/g, with a density controlled to be 0.9-1.2 g/m$^3$.

In Step 3, uniformly mixing the sewage, the magnetic sludge carbon carrier and the activated sludge in a biochemical treatment construction, in which microorganisms are attached on a surface of the magnetic sludge carbon carrier and adsorbed in its interior channels, and multiply in number to generate a composite biofilm; and the channels of the magnetic sludge carbon carrier can also be used for adsorbing a part of pollutants and forming high-concentration and high-density composite carrier particles so as to improve treatment efficiency of this whole biochemical system.

In step 3, a ratio of a sewage inflow to the applied magnetic sludge carbon carrier is 30-60:1, and a sludge concentration for the biochemical system can be increased to 5000-9000 mg/L, and the microorganisms are attached and adsorbed on the magnetic sludge carbon carrier, so that a microorganism concentration is increased and a removal efficiency for the biochemical system is enhanced.

In step 4, a dreg-water separation is performed in a sedimentation tank on the mixed solution flowing out of the secondary biochemical treatment section, after which a supernatant flows into an advanced treatment section and is discharged after reaching a standard, and one part of sediments, which are mainly composite carrier particles, are refluxed to a front influent end of the secondary biochemical treatment section and the other part thereof flow to a magnetic separation apparatus.

In step 4, the composite carrier particles are gravity settled in the sedimentation tank, and are refluxed to the front influent end of the secondary biochemical treatment section by a sludge reflux pump with a reflux ratio of 50-150%.

In step 4, the magnetic particles and the non-magnetic suspending sludge particles are separated from the sediment by a drum type magnetic powder recovery device, with a magnetic field intensity of 4500-6000 Gs, and the separated magnetic particles are placed into a preparation vessel in step 2 to prepare the mixed solution, which is reused and added to the front influent end of the secondary biochemical treatment section.

In step 5, magnetic particles are recycled with the magnetic separation apparatus, in which the magnetic particles are reclaimed to the front influent end of the secondary biochemical treatment section through a magnetic powder recovery device, and the remaining non-magnetic suspending sludge particles and the non-magnetic suspending sludge particles are processed jointly by a sludge deep dewatering process and a carbonization process to generate a new magnetic sludge carbon carrier, which can be used for its own front-end sewage treatment or can be sold.

In step 5, the magnetic separation device is an electromagnetic separation device, in which an automatic control method is adopted in the treatment process and its power is automatically cut off for 10-30 s every a certain time so that the magnetic particles adsorbed on the electromagnet drop and are collected.

In step 5, after the non-magnetic suspending sludge particles are collected in a transfer tank, a bioleaching is performed on the sludge for 36-48 hours during which special bioleaching microbial nutrients are quantitatively added in the bioleaching process; and after the sludge bioleaching is complete, the dewatering of the sludge can be improved and a specific resistance of the sludge can be reduced.

In step 5, after the bioleaching of the sludge is completed, the sludge is pumped into a high-pressure diaphragm plate and frame filter press with a high-pressure feed pump for filter press dewatering with a pressure of 1.6-2.0 MPa, and after a pressure chamber is filled up with the sludge, a press pump is switched for a secondary press dewatering with a pressure of 6.0-7.0 MPa, and moisture content of the dehydrated sludge can be directly reduced to 40%-50% after the secondary high-pressure press dewatering.

In step 5, a main flow of the carbonization process is drying-carbonization (synchronous activation), and a dehydrated sludge cake obtained by the dewatering process is further dried to a moisture content of 20-25%, and then is transported to a carbonization furnace for carbonization after being mixed with the mixed solution in a certain ration, and a temperature is kept constant during the pyrolysis carbonization and a carbonization chamber is in an oxygen-free or anoxic state.

In step 5, a pyrolysis temperature of the carbonization furnace is 500-650° C., and residual heat (300-400° C.) after the carbonization is used for drying the sludge by the dryer.

In step 5, the sludge is carbonized, pyrolyzed and then cooled and sieved to obtain a magnetic sludge carbon product.

Specific Embodiment 2

An experiment of the magnetic sludge carbon carrier for the sewage biochemical treatment of a municipal sewage treatment plant is as follows.

The primary sewage treatment process is mainly composed of a coarse bar screen, a fine bar screen, a cyclone grit chamber, and a primary settling tank. The effluent from the primary settling tank is pumped to the front pilot influent end in the biochemical treatment with a flow rate of 400 L/h.

The magnetic sludge carbon carrier is manufactured by processing the sludge carbon, which is screened with a 200 mesh sieve, mixed with water and stirred in a stirring vessel to prepare a mixed solution with a concentration of 4.0%, and then delivered to the front pilot influent end in the biochemical treatment by a screw pump. A ratio of a sewage inflow to the applied magnetic sludge carbon carrier is 40:1.

The concentration of the sludge in the pilot biochemical treatment system is 6000 mg/L, and the microorganisms are attached and adsorbed on the sludge carbon carrier to form composite carrier particles, which improves the concentration of microorganisms and enhances the removal efficiency of the system.

The composite carrier particles are gravity settled in the vertical flow sedimentation tank, and a part of the sludge is refluxed to pilot front end in the biochemical treatment by a sludge reflux pump, with a reflux ratio of 100%. The magnetic particles and the non-magnetic suspending sludge particles are separated from the other part of the sludge by a magnetic drum type separation device, with a magnetic field intensity of 4500-6000 Gs.

The magnetic drum type separation device operates in an automatic control method, and during its operation, the magnetic particles are adsorbed on the magnetic drum, while the non-magnetic particles flow into the sludge transfer tank at a back end. The separation device is automatically powered off for 15 s every 10 minutes, and the magnetic composite carrier particles adsorbed on the electromagnet automatically drop and are collected when powered off.

It can be seen from FIG. 2 and FIG. 3 that adding the magnetic sludge carbon carrier to the biochemical treatment section can improve the treatment capacity of the biochemical system, and the concentration of COD and ammonia nitrogen in effluent is obviously reduced, with a significant standard upgrading and efficiency improving effect.

Specific Embodiment 3

An experiment of bioleaching and deep dewatering of the residual sludge from a municipal sewage treatment plant is as follows.

The residual sludge of the sewage treatment plant is concentrated by a radial continuous gravity concentration, and the residual sludge of the secondary sedimentation tank is discharged into the concentration tank, and the sludge is gravity concentrated to a moisture content of about 97% without adding a concentration agent. The sludge is taken from the concentration tank for sludge bioleaching, including sludge acclimation, sludge inoculation and sludge cultivation, which is the same as the specific implementation disclosed in CN201410010263.0.

After the sludge enters a leaching pool, special leaching microbial nutrient can be added in an amount which is 8% of the absolute dry sludge, with an aeration cultivation for 24 hours and with a leaching time for 36 hours. After the sludge bioleaching is complete, the dewatering of the sludge can be improved and a specific resistance of the sludge can be reduced.

The concentrated sludge after the bioleaching is pumped into a high-pressure plate and frame for filter press dewatering with a pressure of the high-pressure feed pump being 1.6 MPa, and after a press filter chamber is filled up with the sludge, a press pump is switched for a secondary press dewatering with a pressure of 6.0 MPa. The moisture content of the dehydrated sludge can be directly reduced to 40% after the secondary high-pressure press dewatering.

The dehydrated sludge is naturally air-dried, with the moisture content of about 20% after air drying, crushed and sieved to control particle sizes of the dried sludge to be 5-10 mm and reserve for later use.

See the following table for relevant parameters of the municipal sludge before and after bioleaching treatment.

| Sampling Point | Intake of belt press filter |
| --- | --- |
| Moisture content of the sample, % | 97.24% |
| Moisture content of high-pressure dehydrated sludge cake, % | 39.56% |
| Moisture content of the dried sludge, % | 19.90% |

Specific Embodiment 4

An experiment of preparing the magnetic sludge carbon carrier by carbonization of the sludge from a municipal sewage treatment plant is as follows.

The air-dried sludge particles in Embodiment 3 are mixed with the mixed solution in a certain ration, and then are transported to a carbonization furnace for carbonization; during the pyrolysis carbonization process, and the temperature is kept constant at 500-650° C. during the pyrolysis carbonization and the carbonization chamber is in an oxygen-free or anoxic state.

The sludge is carbonized, pyrolyzed and then cooled and sieved to obtain the magnetic sludge carbon product.

The specific surface area of the magnetic sludge carbon carrier is 55 m2/g, and the density is controlled to be 0.9 g/m3.

To sum up, the sewage treatment process with a magnetic sludge carbon carrier cooperated with standard upgrading and capacity improvement has a strong implementability, which can realize cyclic standard upgrading and capacity improvement in the sewage treatment plant, while each single process can also run independently. The sewage treatment process with a magnetic sludge carbon carrier cooperated with standard upgrading and capacity improvement has advantages of strong feasibility, low cost, high production efficiency and the like, and it is suitable for large-scale production, has good environmental and economic benefits, and presents technical advantages of environmental friendliness and sustainable development.

In addition, it should be noted that the specific embodiments described in this specification may have different shapes, names or the like of parts and components; and the above contents described in this specification are only examples of the structure of the present disclosure. Equivalent or simple changes made in accordance with the configurations, features and principles described in the inventive concept are included in the scope of protection of the inventive disclosure. Various modifications, supplements or similar replacements can be made to the described specific embodiments by those skilled in the art to which the present disclosure pertains, which fall within the protection scope of the present disclosure without departing from the structure of the present disclosure or beyond the scope defined by the claims.

What is claimed is:

1. A sewage treatment process comprising the following steps:
   Step 1: performing a primary treatment on the sewage and removing suspended solid pollutants after the primary treatment for the sewage, and placing the treated sewage without the suspended solid pollutants into a secondary biochemical treatment section;
   Step 2: mixing a magnetic sludge carbon carrier and a solvent to prepare a first mixed solution which is then placed into the secondary biochemical treatment section synchronously with the sewage;
   Step 3: uniformly mixing the sewage, the magnetic sludge carbon carrier and activated sludge in a first biochemical treatment section to form a second mixed solution, in which microorganisms are attached on a surface of the magnetic sludge carbon carrier and adsorbed in its interior channels, and multiply in number to generate a composite biofilm;
   Step 4: performing a dreg-water separation in a sedimentation tank on the second mixed solution flowing out of the secondary biochemical treatment section, thereby forming a supernatant that flows into an advanced treatment section and is discharged after reaching a predefined standard, and one part of sediments, which are composite carrier particles, are refluxed to a front influent end of the secondary biochemical treatment section and a second part of the sediments thereof are magnetically separated;
   Step 5: recycling magnetic particles, in which the magnetic particles are reclaimed to the front influent end of the secondary biochemical treatment section, and the remaining non-magnetic suspended sludge particles are processed jointly by a sludge dewatering process and a carbonization process to generate the magnetic sludge carbon carrier.

2. The sewage treatment process according to claim 1, wherein
   in the step 1, the primary treatment includes a physical treatment method.

3. The sewage treatment process according to claim 1, wherein in the step 2, the magnetic sludge carbon carrier first mixed solution is stirred by a stirring vessel to obtain a concentration of 1-5% kg/kg wt %, and is pumped into the front influent end of the secondary biochemical treatment section by a screw pump;
   in the step 2, a specific surface area of the magnetic sludge carbon carrier is 30-100 $m^2$/g, with a density controlled to be 0.9-1.2 $g/m^3$.

4. The sewage treatment process according to claim 1, wherein
   in the step 3, a ratio of a sewage inflow to the applied magnetic sludge carbon carrier is 30-60:1 kg:kg, and a sludge concentration for the first biochemical treatment section is increased to 5000-9000 mg/L, and the microorganisms are attached and adsorbed on the magnetic sludge carbon carrier, so that a microorganism concentration is increased and a removal efficiency for the first biochemical treatment section is enhanced.

5. The sewage treatment process according to claim 1, wherein
in the step 4, the composite carrier particles are gravity settled in the sedimentation tank, and are refluxed to the front influent end of the secondary biochemical treatment section by a sludge reflux pump with a reflux ratio of 50-150% V/V;
in the step 4, the magnetic particles and the non-magnetic suspending sludge particles are separated from the sediment by a magnetic powder recovery device, with a magnetic field intensity of 4500-6000 Gs, and the separated magnetic particles are placed into the step 2 to prepare the first mixed solution, which is added to the front influent end of the secondary biochemical treatment section.

6. The sewage treatment process according to claim 1, wherein
in the step 5, an automatic control method is adopted in the treatment process and its power is automatically cut off for 15 s every 10 mins so that the magnetic particles adsorbed on the electromagnet drop and are collected;
in the step 5, after the non-magnetic suspending sludge particles are collected in a transfer tank, a bioleaching is performed on the sludge for 36-48 hours.

7. The sewage treatment process according to claim 6, wherein
in the step 5, after the bioleaching of the sludge is completed, the sludge is pumped into a high-pressure diaphragm plate and frame filter press with a high-pressure feed pump for filter press dewatering with a pressure of 1.6-2.0 MPa, and after a pressure chamber is filled up with the sludge, a press pump is switched for a secondary press dewatering with a pressure of 6.0-7.0 MPa.

8. The sewage treatment process according to claim 1, wherein
in the step 5, a dehydrated sludge cake obtained by the dewatering process is dried to a moisture content of 20-25%, and then is transported to a carbonization furnace for carbonization after being mixed with the second mixed solution in a certain ratio, and a temperature is kept constant during the pyrolysis carbonization and a carbonization chamber is in an oxygen-free or anoxic state.

9. The sewage treatment process according to claim 8, wherein
in the step 5, a pyrolysis temperature of the carbonization furnace is 500-650° C., and residual heat after the carbonization is used for drying the sludge by a dryer.

10. The sewage treatment process according to claim 8, wherein in the step 5, the sludge is carbonized, pyrolyzed and then cooled and sieved.

* * * * *